(12) United States Patent
Walsh et al.

(10) Patent No.: US 10,633,099 B2
(45) Date of Patent: Apr. 28, 2020

(54) NON-HORIZONTAL WATER EXTRACTOR

(71) Applicant: Hamilton Sundstrand Corporation, Charlotte, NC (US)

(72) Inventors: Kevin P. Walsh, Enfield, CT (US); Murtuza Lokhandwalla, South Windsor, CT (US); Patrick McCord, Norwich, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 108 days.

(21) Appl. No.: 15/918,733

(22) Filed: Mar. 12, 2018

(65) Prior Publication Data
US 2019/0276155 A1   Sep. 12, 2019

(51) Int. Cl.
| B64D 13/06 | (2006.01) |
| F01D 15/00 | (2006.01) |
| B01D 5/00 | (2006.01) |
| B01D 45/16 | (2006.01) |
| B01D 53/26 | (2006.01) |
| F24F 3/14 | (2006.01) |

(52) U.S. Cl.
CPC .......... B64D 13/06 (2013.01); B01D 5/0075 (2013.01); B01D 5/0081 (2013.01); B01D 45/16 (2013.01); B01D 53/265 (2013.01); F01D 15/005 (2013.01); *B01D 2259/4575* (2013.01); *B64D 2013/0662* (2013.01); *F24F 2003/144* (2013.01)

(58) Field of Classification Search
CPC ........ B64D 13/06; B64D 13/00; B64D 15/20; B64D 13/08; B64D 2013/0662; F01D 15/005; F24F 2003/144; F24F 3/1405; B04C 3/06; F28D 9/0062
See application file for complete search history.

(56) References Cited

U.S. PATENT DOCUMENTS

| 3,339,349 A | 9/1967 | Farnum |
| 3,834,126 A | 9/1974 | DiMinno, Jr. |
| 4,224,043 A | 9/1980 | Dupre |
| (Continued) | | |

FOREIGN PATENT DOCUMENTS

| FR | 2642662 A1 | 8/1990 |
| GB | 800932 | 9/1958 |
| (Continued) | | |

OTHER PUBLICATIONS

Extended European Search Report for EP Application No. 19162339.6, dated Jul. 15, 2019, 12 pages.

*Primary Examiner* — Emmanuel E Duke
(74) *Attorney, Agent, or Firm* — Kinney & Lange, P.A.

(57) ABSTRACT

A water extractor includes a body with an outer wall, an inlet, an outlet, a first centerline axis, an inner nozzle, an outer chamber, a serpentine channel, a pocket, and a boss. The first centerline axis extends through a center of the body, the outlet, and the inlet. The inner nozzle is co-axial with the first centerline axis. The outer chamber extends between the outer wall and the inner nozzle. The serpentine channel fluidly connects the inlet and the outer chamber. The pocket is fluidly connected to a portion of the outer chamber and is configured to collect water from the outer chamber. The boss extends from and is fluidly connected to the pocket. The boss includes a second centerline axis at an angle with the first centerline axis of approximately 10 degrees or greater.

19 Claims, 5 Drawing Sheets

(56) References Cited

U.S. PATENT DOCUMENTS

| | | | |
|---|---|---|---|
| 4,238,210 A | 12/1980 | Regehr et al. | |
| 4,681,610 A * | 7/1987 | Warner | B01D 45/16 55/338 |
| 6,056,798 A | 5/2000 | Cox | |
| 6,152,978 A | 11/2000 | Lundquist | |
| 6,331,195 B1 | 12/2001 | Faust et al. | |
| 7,188,488 B2 | 3/2007 | Army, Jr. et al. | |
| 7,266,958 B2 * | 9/2007 | Milde | B01D 45/16 55/319 |
| 7,338,545 B2 | 3/2008 | Bazzarella et al. | |
| 7,342,332 B2 | 3/2008 | McAuliffe et al. | |
| 7,470,300 B2 | 12/2008 | Faust et al. | |
| 7,691,185 B2 | 4/2010 | Darke et al. | |
| 8,177,475 B2 | 5/2012 | Joco et al. | |
| 8,875,535 B2 | 11/2014 | Peacos, III et al. | |
| 9,199,248 B2 | 12/2015 | Au et al. | |
| 2002/0144599 A1 * | 10/2002 | Afeiche | B01D 45/16 95/269 |
| 2007/0125051 A1 * | 6/2007 | Faust | B01D 45/16 55/447 |
| 2008/0271421 A1 * | 11/2008 | Darke | B01D 45/16 55/396 |
| 2009/0235622 A1 * | 9/2009 | Stucki | F22B 37/28 55/418 |
| 2011/0126572 A1 * | 6/2011 | Peacos, III | B64D 13/00 62/291 |
| 2012/0233973 A1 | 9/2012 | Sedillo | |
| 2015/0233386 A1 | 8/2015 | Beers et al. | |
| 2016/0045923 A1 | 2/2016 | Correia et al. | |
| 2016/0193558 A1 | 7/2016 | Jeong | |
| 2016/0281721 A1 | 9/2016 | Army, Jr. et al. | |

FOREIGN PATENT DOCUMENTS

| | | |
|---|---|---|
| JP | H072702 U | 1/1995 |
| JP | 2578964 Y2 | 8/1998 |
| JP | 2013119078 A | 6/2013 |
| KR | 20140123918 A | 10/2014 |
| WO | WO99/59867 A1 | 11/1999 |

* cited by examiner

NON-HORIZONTAL WATER EXTRACTOR

BACKGROUND

The present disclosure is directed generally to an air conditioning pack ("ACP"), and more specifically, to a water extractor for an ACP.

Air cycle machines ("ACMs") are used as part of ACPs for processing a pressurized air source, such as bleed air from a gas turbine engine of an aircraft. ACMs compress air in a compressor section which is discharged to a downstream heat exchanger and further routed to a turbine. The turbine extracts energy from the expanded air to drive the compressor. The air output from the turbine is utilized as an air supply for a vehicle, such as a cabin of an aircraft. ACMs are used to achieve a desired pressure, temperature, and humidity in the air that is transferred to the environmental control system ("ECS") of the aircraft to provide cooled air to the cabin and a cockpit of the aircraft.

Water extractors used in ACPs are designed to extract water from bleed air that is flowing through the ACP. This process is required because if moist air is allowed to enter the ACM turbines, the water could freeze on the turbine blades or cause a flow blockage resulting in premature ACM and ACP failure. Therefore, it is important to remove this water and provide dry air to the ACM turbines.

Existing water extractors for ACPs are designed to operate in a horizontal flow orientation. Such an orientation can be accommodated during new design programs. However, off-the-shelf ACPs, or ACPs previously designed for use on another program, are sometimes proposed for use in new design programs as a way to reduce development costs. If the off-the-shelf ACP is installed in a new aircraft in a different orientation to that used in the original design, then the water extractor may not be in a horizontal orientation resulting in reduced water extraction efficiency and potential ACM failure.

SUMMARY

A water extractor includes a body, an inlet, an outlet, a first centerline axis, an inner nozzle, an outer chamber, a serpentine channel, a pocket, and a boss. The body includes an outer wall. The inlet is disposed on an upstream end of the body and the outlet is disposed on a downstream end of the body. The first centerline axis extends through a center of each of the body, the outlet, and the inlet. The inner nozzle is disposed radially inward from the outer wall and is co-axial with the first centerline axis. The outer chamber is disposed in the body and extends between the outer wall and the inner nozzle. The outer chamber is fluidly connected to the inlet and the outlet. The serpentine channel is disposed radially between the outer wall of the body and the inner nozzle and fluidly connects the inlet and the outer chamber. The pocket is attached to a portion of the outer wall of the body and is fluidly connected to a portion of the outer chamber. The pocket is configured to collect water from a flow of fluid passing through the outer chamber. The boss extends from and is fluidly connected to a portion of the pocket. The boss includes a second centerline axis such that an angle between the second centerline axis and the first centerline axis is approximately 10 degrees or greater.

A method of extracting water from a flow of air includes swirling the flow of air. The flow of air is inserted into a water extractor. The water extractor includes a first centerline axis passing through a center of the water extractor along a longitudinal direction of the water extractor. The swirling flow of air is split into a primary flow of air and a secondary flow of air within the water extractor. The secondary flow is diverted into an outer chamber of the water extractor disposed between an inner nozzle and an outer wall of a body of the water extractor. Water separated from the secondary flow is received into a pocket fluidly connected to the outer chamber and attached to the outer wall of the body of the water extractor. The water received by the pocket is communicated into a boss connected to the pocket. The water is drawn from the boss. The boss includes a second centerline axis that is set at a first angle relative to the first centerline axis that is approximately 10 degrees or greater.

An air conditioning pack for an aircraft includes a condenser, an air cycle machine connected to the condenser, and a water extractor. The water extractor includes a body with an outer wall, an inner nozzle, an inlet, an outlet, an outer chamber, a pocket, and a boss. The outer wall includes an upstream portion and a downstream portion. The inner nozzle is disposed radially inward from the outer wall. The upstream and downstream portions of the outer wall are oriented relative to a direction of a flow of fluid through the inner nozzle. The inlet is disposed on an upstream end of the body and is fluidly connected to the condenser. The outlet is disposed on a downstream end of the body and is fluidly connected to the air cycle machine. The outer chamber is disposed in the body and extends between the outer wall and the inner nozzle. The outer chamber is fluidly connected to the inlet and the outlet. The outer chamber includes an upstream portion and a downstream portion. The outer chamber is configured to receive a flow of moisture-laden air from the inlet and is configured to deposit moisture from the flow of moisture-laden air onto the outer wall. The pocket is connected to the outer wall of the body and includes an upstream portion and a downstream portion. The upstream portion of the pocket is attached to the upstream portion of the outer wall and is fluidly connected to the upstream portion of the outer chamber. The pocket is configured to collect the deposited moisture from the outer wall. The boss extends from the pocket and is fluidly connected to the outer chamber via the pocket. The boss is configured to withdraw the collected moisture from the pocket.

DETAILED DESCRIPTION

Figure 1:
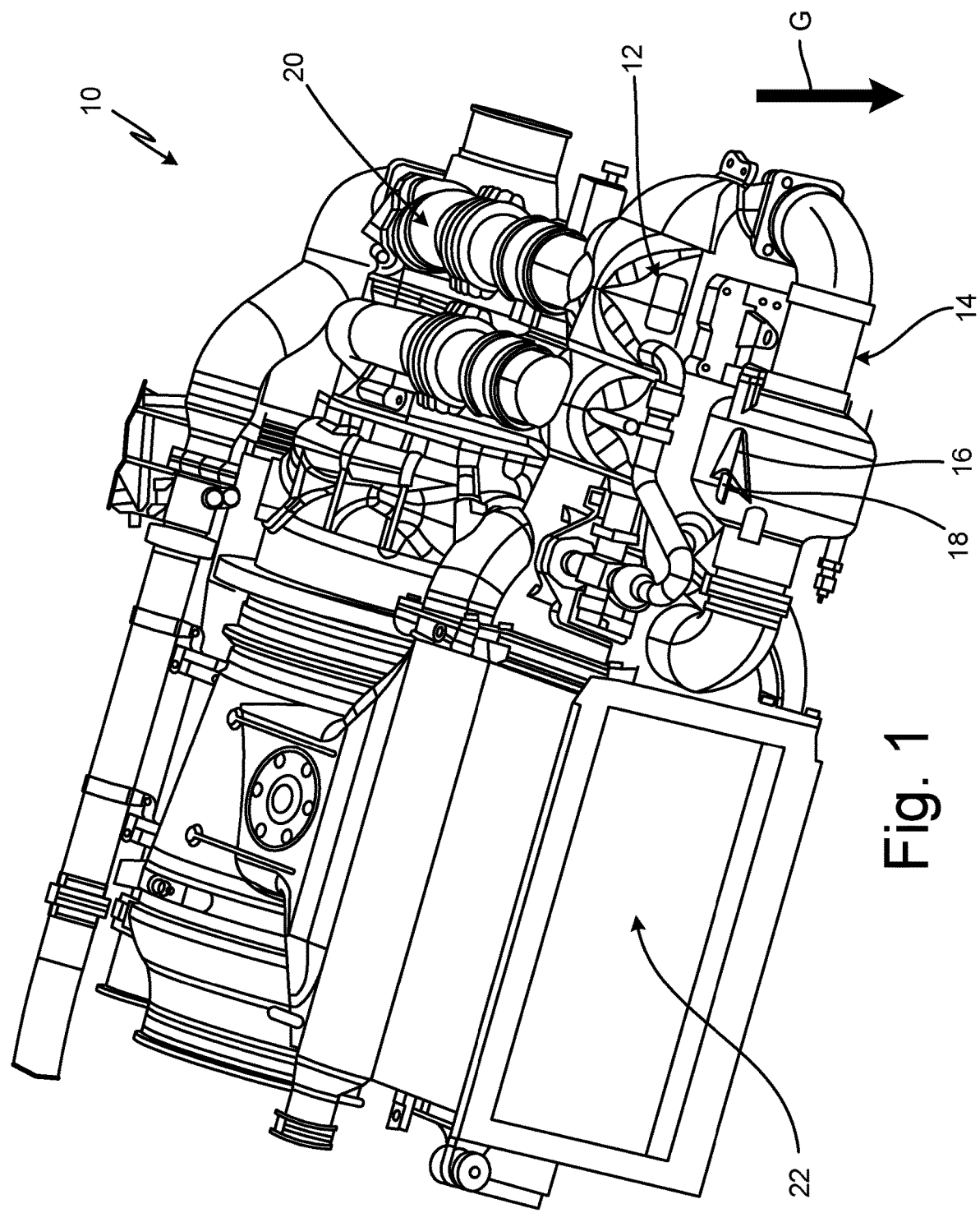
FIG. 1 is a perspective view of an air conditioning pack with an air cycle machine and a water extractor.

FIG. 1 is a perspective view of air conditioning pack ("ACP") 10 and shows condenser 12, water extractor 14 (with pocket 16 and boss 18), air cycle machine 20, heat exchanger 22, and direction G of gravity. In this non-limiting embodiment, ACP 10 is an air conditioning pack suitable for an aircraft. Condenser 12 is a condenser heat exchanger configured to remove water from a flow of air passing through or across condenser 12.

Water extractor 14 is a device configured to remove condensate from a flow of fluid through water extractor 14.

In one non-limiting embodiment, water extractor 14 is configured as an inertial particle separator for fluids. In another non-limiting embodiment, water extractor 14 and the elements of water extractor 14 (see e.g., FIGS. 2A, 2B, and 3) can be manufactured through layer-by-layer additive manufacturing, injection molding, fabrication, or other manufacturing techniques. In another non-limiting embodiment, a material of water extractor 14 and/or pocket 16 and boss 18 can include metal such as aluminum, plastic, thermoplastic such as carbon-fiber-reinforced polyether ether ketone, or another solid material suitable for passage of a fluid with a temperature of 32° to 500° F. (0° to 260° C.).

Pocket 16 is a curved piece of solid material that forms a horizontal basin. Boss 18 is an outlet configured for transmission of a fluid. ACM 20 is an air cycle machine of an aircraft. In this non-limiting embodiment, heat exchanger 22 is a dual heat exchanger configured to transfer heat to or from a fluid (e.g., air) that passes through heat exchanger 22. Direction G is representative of a direction of gravity when the aircraft containing ACP 10 is on the ground or in horizontal flight.

In one non-limiting embodiment, ACP 10 can be fluidly connected to an intermediate or high pressure stage of a gas turbine engine. Although ACP 10 is shown as including a single ACM 20, in other non-limiting embodiments ACP 10 can include a multi-ACM configuration such as a first ACM and a second ACM with first and second cooling inlets, respectively and a first water extractor and a second water extractor connected to the first and second cooling inlets, respectively.

In this non-limiting embodiment, condenser 12 is connected to heat exchanger 22. Condenser 12 is attached and fluidly connected to water extractor 14. Water extractor 14 is attached to condenser 12 and is fluidly connected to condenser 12 and ACM 20. Pocket 16 is mounted to a portion of water extractor 14. In this non-limiting embodiment, water extractor 14 is shown as including one pocket 16 with one boss 18. In other non-limiting embodiments (see e.g., FIGS. 2B and 3), water extractor 14 can include two or more pockets 16 with corresponding bosses 18. Boss 18 is attached and connected to pocket 16. Boss 18 is fluidly connected to water extractor 14 via pocket 16. ACM 20 is fluidly connected to water extractor 14. Heat exchanger 22 is mounted within ACP 10 and is fluidly connected to condenser 12. In this non-limiting embodiment, boss 18 would be capped and not in use given the orientation of ACP 10 relative to gravity depicted in FIG. 1.

Aircraft (e.g., commercial aircraft) are typically equipped with one or more ACPs 10 that provide pressurized, conditioned air to the cockpit and passenger cabin of the aircraft. ACP 10 is supplied with high pressure, hot air either from engines or from electrically driven compressors of the aircraft. ACP 10 uses ACM 20 with turbines to cool the supplied air down to freezing temperatures. Upstream of ACM 20, water extractor 14 receives air from condenser 12 and is used to extract any condensed moisture before the moisture enters ACM 20 and freezes on the turbine blades. Water freezing on the turbine blades could cause premature failure of ACM 20 resulting in an in-flight failure of ACM 10. Additional details of ACPs can be found in U.S. Pat. No. 7,188,488, which is herein incorporated by reference in its entirety. Additional details of ACMs can be found in U.S. patent application Ser. No. 14/180,777 filed on Feb. 14, 2014, which is herein incorporated by reference in its entirety.

In some non-limiting embodiments, ACP 10 may be required to be positioned at an angle respective to direction G of gravity, which may require water extractor 14 to also be positioned at an angle respective to a horizontal plane such that an inlet of water extractor 14 is lower than an outlet of water extractor 14. Such an angle with respect to horizontal can reduce water extraction efficiency of water extractor 14 and potentially cause failure of ACM 10 if the water collected by water extractor 14 is not removed from water extractor 14 at a high enough efficiency rate. As will be discussed with respect to FIGS. 2A, 2B, and 3, water extractor 14 with pocket 16 and boss 18 enables water extractor 14 to be positioned at an angle with respect to horizontal while maintaining a requisite efficiency of water extractor 14 due to the horizontal placements of pocket 16 and boss 18.

Figure 2A:
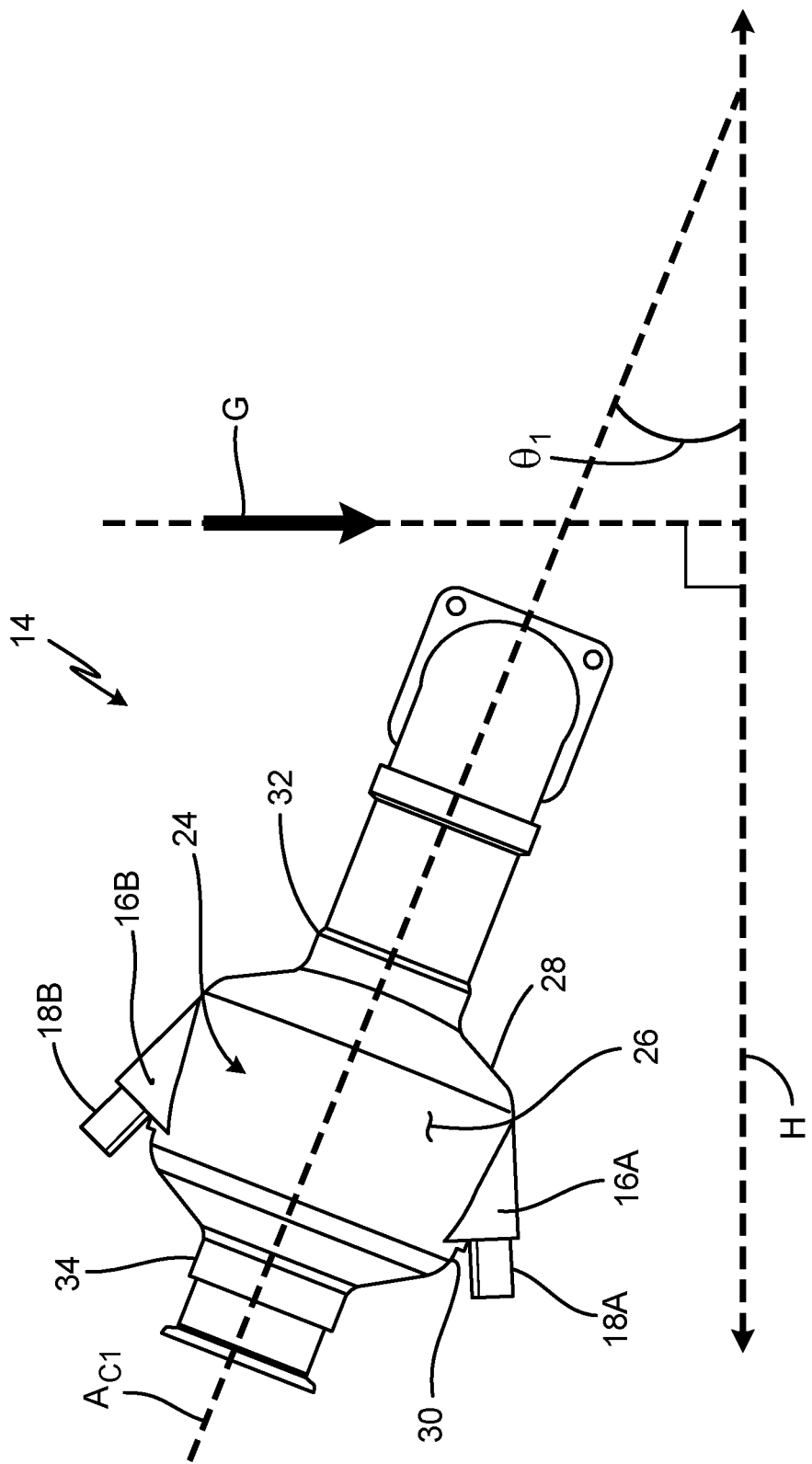
FIG. 2A is a side view of the water extractor with a pocket and a boss shown relative to a direction of gravity.
Figure 2B:
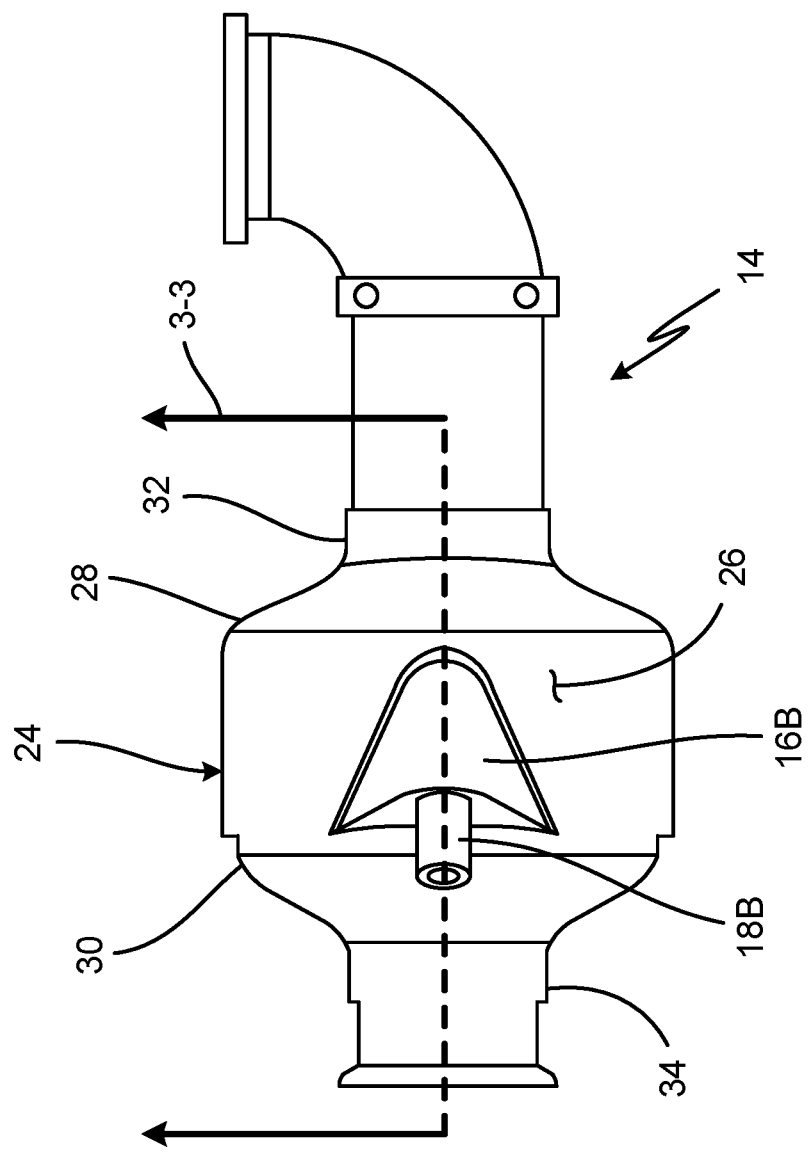
FIG. 2B is a top view of the water extractor.

FIG. 2A is a side view of water extractor 14 and shows pockets 16A and 16B, bosses 18A and 18B, body 24 (with outer wall 26, upstream portion 28, and downstream portion 30), inlet 32, outlet 34, first centerline axis $A_{C1}$, direction G of gravity, horizontal plane H, and first angle $\theta_1$. FIG. 2B is a top view of water extractor 14 and shows pocket 16B, boss 18B, and body 24 (with outer wall 26, upstream portion 28, and downstream portion 30), inlet 32, and outlet 34. FIGS. 2A and 2B include the same or similar elements and will be discussed in unison.

Body 24 is an enlarged, central portion of water extractor 14. Outer wall 26 is a cylindrical barrier of solid material. Upstream portion 28 is a portion of body 24 that is located on an upstream end (to the right in FIGS. 2A and 2B) of body 24. Downstream portion 30 is a portion of body 24 that is located on a downstream end (to the left in FIGS. 2A and 2B) of body 24. Inlet 32 and outlet 34 are tubes of solid material that are configured to transport a fluid. First centerline axis $A_{C1}$ is an axis extending longitudinally through a center of water extractor 14. Direction G is a direction of gravity relative to ACP 10 (shown in FIG. 1) and water extractor 14. Horizontal plane H is a plane that is representative of the horizontal direction when the aircraft containing ACP 10 is on the ground or in horizontal flight. In this non-limiting embodiment, horizontal plane H is orientated at a 90 degree angle with respect to direction G of gravity. First angle $\theta_1$ is an angle between first centerline axis $A_{C1}$ and horizontal plane H. First angle $\theta_1$ is an angle of inclination with respect to horizontal plane H.

Pocket 16A is mounted to a portion of body 24 and pocket 16B is mounted to another portion of body 24. In this non-limiting embodiment, pocket 16A is mounted to a bottom portion of body 24 (a bottom of body 24 as shown in FIG. 2A) and pocket 16B is mounted to a top portion of body 24 (the top of body 24 as shown in FIG. 2A). Boss 18A extends from and is fluidly connected to pocket 16A. Boss 18B extends from and is fluidly connected to pocket 16B. Boss 18A is fluidly connected to body 24 via pocket 16A and boss 18B is fluidly connected to body 24 via pocket 16B.

Body 24 is co-axial with first centerline axis $A_{C1}$ and is disposed between inlet 32 and outlet 34. Body 24 is fluidly connected to inlet 32 and to outlet 34. Outer wall 26 extends around a circumference of body 24. Upstream portion 28 of body 24 is connected to downstream portion 30. Downstream portion 30 of body 24 is positioned downstream of upstream portion 28 relative to a direction of a flow of fluid through water extractor 14, which as shown in FIGS. 2A and 2B as right to left (and slightly upwards). Inlet 32 and outlet 34 are attached and fluidly connected to body 24. First centerline axis $A_{C1}$ passes through centers of body 24, inlet 32, and outlet 34 of water extractor 14. Direction G of gravity points in a downward direction in FIG. 2A. Relative to the orientation of water extractor 14 shown in FIG. 2B, direction G of gravity would be into of the page. In this non-limiting embodiment, first angle $\theta_1$ is greater than zero degrees meaning that outlet 34 is higher than inlet 32. In one non-limiting embodiment, first angle $\theta_1$ can be 10 degrees to 55 degrees.

As will be discussed further with respect to FIGS. 3A and 3B, water extractor 14 functions by centrifuging a flow of air passing through water extractor 14 so as to drawn moisture in the flow of air radially outward and into an outer portion of body 24 where the moisture is collected by pocket 16A or pocket 16B. Pockets 16A and 16B both include a curved cavity in which moisture is collected and through which the moisture is communicated to bosses 18A and 18B, respectively. Bosses 18A and 18B are used to remove collected moisture from pockets 16A and 16B, respectively. In one non-limiting embodiment, only one set of pocket 16A and boss 18A or pocket 16B and boss 18B are used during operation of ACP 10. For example, depending on the orientation of ACP 10 and corresponding orientation of water extractor 14, whichever pocket ends up on top of water extractor 14, can have its corresponding boss plugged to prevent fluid transfer through that boss. In this non-limiting embodiment, only boss 18A would be used to extract water and boss 18*b* would be capped and not in use given the orientation of ACP 10 relative to gravity depicted in FIG. 2A.

Body 24 fluidly contains a portion of a flow of air that passes through water extractor 14. As will be discussed further with respect to FIGS. 3A and 3B, moisture in the flow of air passed through water extractor 14 is sent through an outer portion of body 24 so as to be extracted from the flow of air. Outer wall 26 contains the flow of air through body 24. Upstream portion 28 of body 24 directs a portion of the flow through water extractor 14 into body 24. Downstream portion 30 of body 24 directs a portion of the flow within body 24 to outlet 34. Inlet 32 receives a flow of air and delivers that air to body 24. Outlet 34 receives the flow of air from body 24 and delivers the flow of air out of water extractor 14.

Water extractor 14 with pocket 16 and boss 18 allows water extractor 14 to be installed in a non-horizontal orientation with no loss of efficiency by providing boss 18 that is located at a low point, or gravitational bottom, of body 24 so as to collect the greatest amount of moisture from body 24.

Figure 3A:
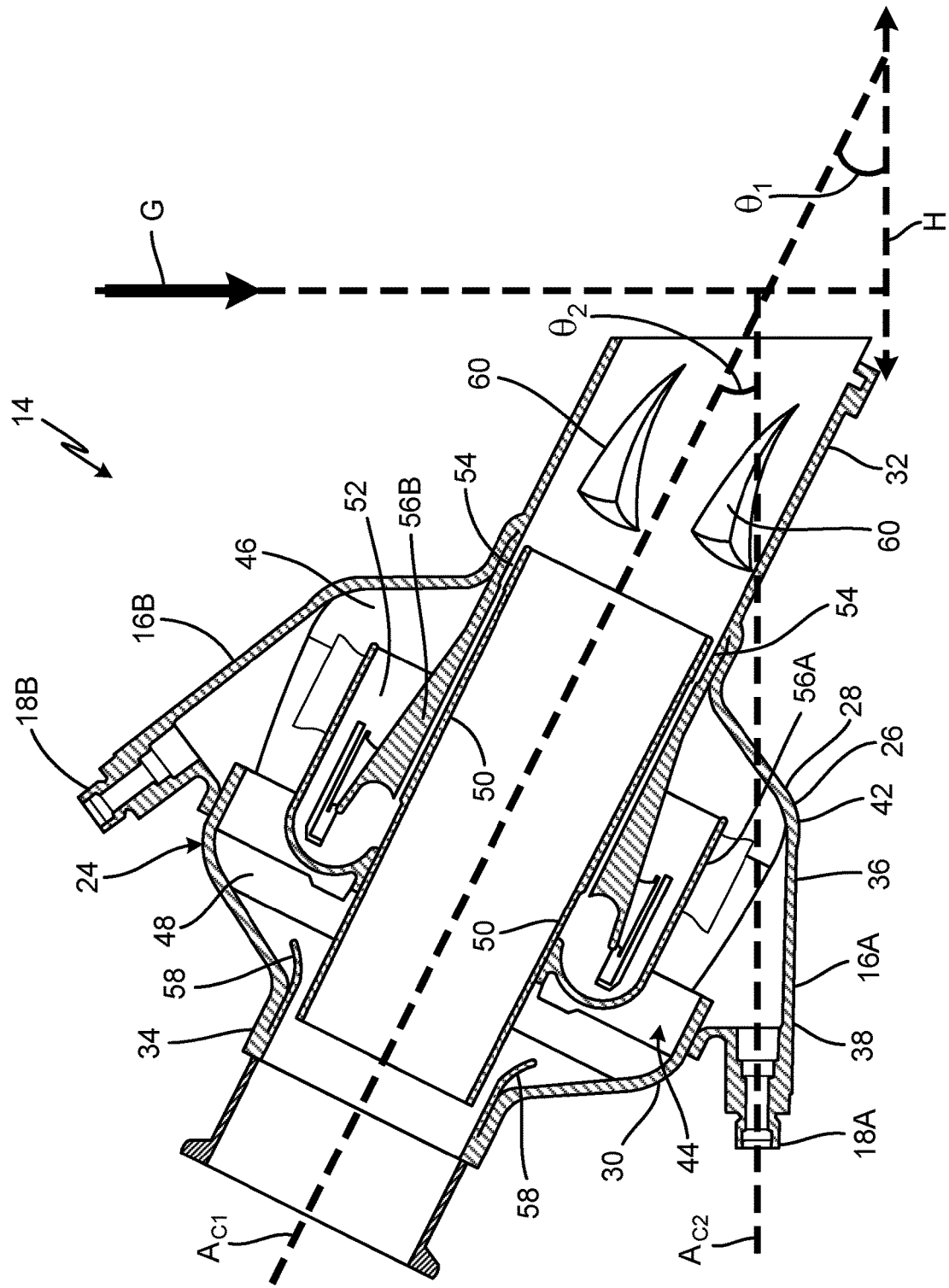
FIG. 3A is a cross-section view of the water extractor taken along 3-3 in FIG. 2B.
Figure 3B:
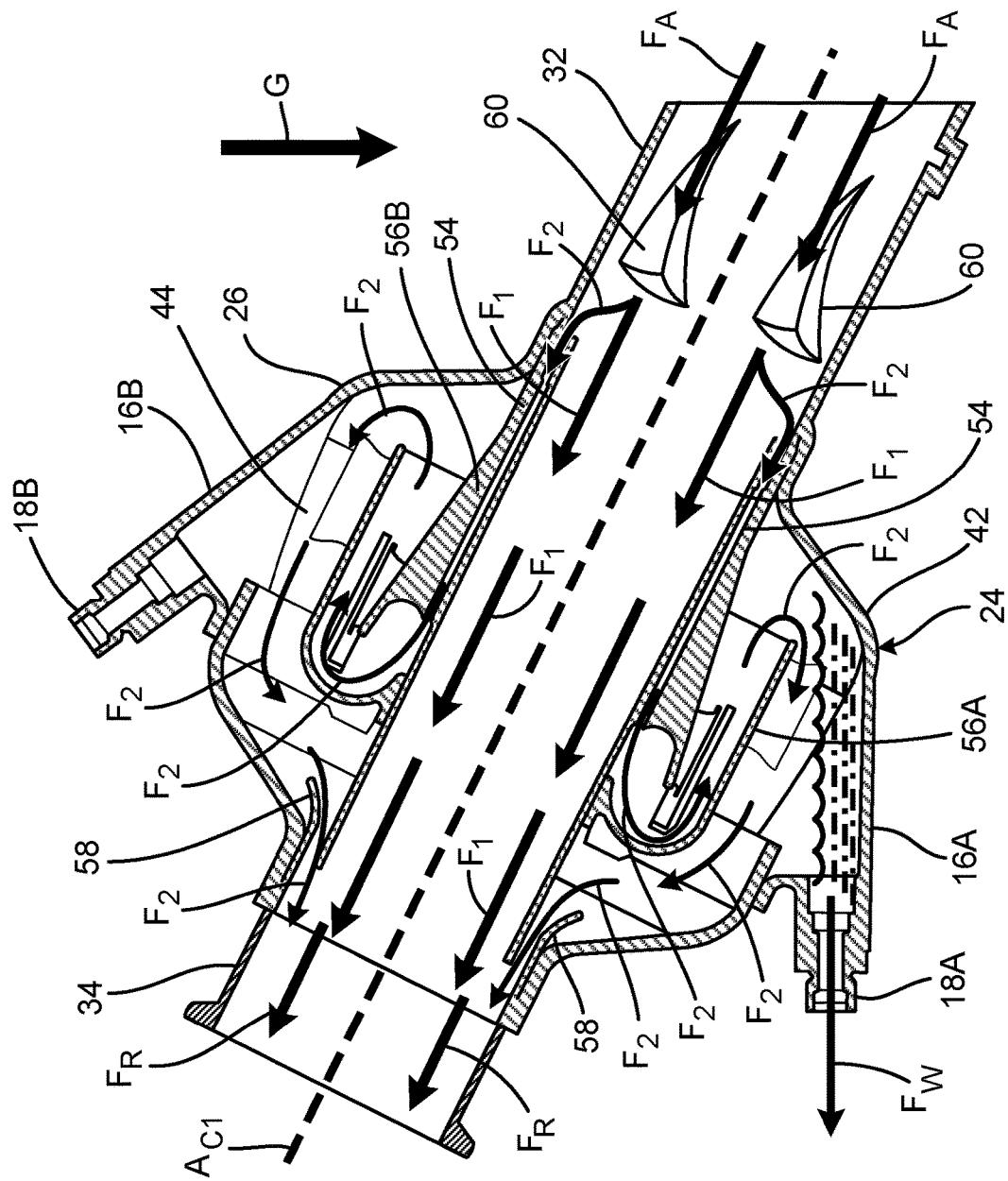
FIG. 3B is a cross-section view of the water extractor taken along 3-3 in FIG. 2B and shows flowpaths of air flowing through the water extractor.

FIG. 3A is a cross-section view of water extractor 14 taken along 3-3 in FIG. 2B and shows water extractor 14, pocket 16A (with upstream portion 36 and downstream portion 38), pocket 16B, boss 18A, boss 18B, body 24 (with outer wall 26, upstream portion 28, downstream portion 30, gravitational bottom 42, outer chamber 44 (including upstream end 46 and downstream end 48), inner nozzle 50, and serpentine channel 52), annular gap 54, flow guides 56A and 56B, ejector 58, inlet 32 (with vanes 60), outlet 34, first centerline axis $A_{C1}$, second centerline axis $A_{C2}$, first angle $\theta_1$, second angle $\theta_2$, direction G of gravity, and horizontal plane H. FIG. 3B is a cross-section view of water extractor 14 taken along 3-3 in FIG. 2B and shows water extractor 14, pocket 16A, pocket 16B, boss 18A, boss 18B, body 24 (with outer wall 26, gravitational bottom 42, outer chamber 44, inner nozzle 50, and serpentine channel 52), annular gap 54, flow guides 56A and 56B, ejector 58, inlet 32 (with vanes 60), outlet 34, first centerline axis $A_{C1}$, initial flow $F_A$, primary flow $F_1$, secondary flow $F_2$, resultant flow $F_R$, flow $F_W$, and direction G of gravity. FIGS. 3A and 3B include the same or similar elements and will generally be discussed in unison.

To help orient the reader, a brief description of the orientation of water extractor 14 with regards to a general direction of flow through water extractor 14 will be provided. In general, a flow of fluid flows through water extractor 14 from the right side or end of water extractor as shown in FIGS. 3A and 3B to the left side or end of water extractor as shown in FIGS. 3A and 3B. As such, the term downstream will generally refer to the left end of water extractor 14 as shown in FIGS. 3A and 3B (for example, the end of water extractor 14 where outlet 34 is located). Conversely, the term upstream will generally refer to the right end of water extractor 14 as shown in FIGS. 3A and 3B (for example, the end of water extractor 14 where inlet 32 is located). Similarly, the term downstream direction will refer to a direction that is right to left as shown in FIGS. 3A and 3B and is generally aligned with first centerline axis $A_{C1}$. Conversely, the term upstream direction will refer to a direction that is left to right as shown in FIGS. 3A and 3B and is generally aligned with first centerline axis $A_{C1}$.

Upstream portion 36 is an upstream end of pocket 16A. Downstream portion 38 is a downstream end of pocket 16A. Gravitational bottom 42 is disposed at a bottom point of body 24 (and of outer wall 26) relative to direction G of gravity. Outer chamber 44 is a fluidic passage. Upstream end 46 is an upstream end of outer chamber 44. Downstream end 48 is a downstream end of outer chamber 44. Inner nozzle 50 is a generally cylindrical tube of solid material. Serpentine channel 52 is an annular flow passage with at least one bend configured to reverse a direction of flow passing through serpentine channel 52 from a downstream direction to an upstream direction of water extractor 14. Annular gap 54 is an annular fluidic passageway. Flow guides 56A and 56B are tube-shaped annuluses of solid material. Ejector 58 is a portion of water extractor 14 that forms an annular fluidic passageway with a constricted area of flow.

Vanes 60 are fins or blades for imparting swirl or spin on a fluid which passes across vanes 60. Second centerline axis $A_{C2}$ is an axis extending longitudinally through a center of boss 18A. Second angle $\theta_2$ is an angle extending between second centerline axis $A_{C2}$ and first centerline axis $A_{C1}$. Second angle $\theta_2$ is an angle of declination of second centerline axis $A_{C2}$ with respect to first centerline axis $A_{C1}$. In this non-limiting embodiment, second centerline axis $A_{C2}$ is approximately perpendicular to direction G of gravity and approximately parallel to horizontal plane H. Initial flow $F_A$ is a flow of cooling air coming from condenser 12 (shown in FIG. 1). Primary flow $F_1$ is a flow of air flowing through inner nozzle 50. Secondary flow $F_2$ is a flow of fluid passing through outer chamber 44. In this non-limiting embodiment, secondary flow $F_2$ is a flow of moisture-laden air. Resultant flow $F_R$ is a combined flow of air including primary flow $F_1$ and secondary flow $F_2$. In this non-limiting embodiment, flow $F_W$ is a flow of water. In other non-limiting embodiments, flow $F_W$ can include part liquid water and part moisture-laden air.

Pocket 16A is disposed along and on a bottom of body 24 between inlet 32 and outlet 34. In this non-limiting embodiment, pocket 16A is attached and connected to gravitational bottom 42 of body 24. Pocket 16A is fluidly connected to outer chamber 44 at gravitational bottom 42 of body 24. Pockets 16A and 16B are configured to collect water from secondary flow $F_2$ passing through outer chamber 44. Boss 18A extends from pocket 16A and is fluidly connected to pocket 16A. Boss 18B extends from pocket 16B and is fluidly connected to pocket 16B. Second centerline axis $A_{C2}$ of boss 18A intersects with first centerline axis $A_{C1}$ of water extractor 14 at second angle $\theta_2$. In this non-limiting embodiment, second angle $\theta_2$ is approximately 10 to 45 degrees. In another non-limiting embodiment, second angle $\theta_2$ is approximately 26 degrees. In this non-limiting embodiment, second angle $\theta_2$ is greater than or equal to first angle $\theta_1$. In this non-limiting embodiment, second centerline axis $A_{C2}$ of boss 18 is perpendicular to direction G of gravity and parallel to horizontal plane H.

Body 24 of water extractor 14 is attached and is fluidly connected to inlet 32 and outlet 34. Outer wall 30 is an exterior of body 24. Outer wall 30 surrounds and encloses outer chamber 44. Inlet 32 is fluidly connected to inner nozzle 50 and to outer chamber 44 via serpentine channel 52. Inlet 32 is disposed on upstream portion 28 of body 24. Outlet 34 is an opening of body 24. Outlet 34 is fluidly connected to inner nozzle 50 and to outer chamber 44 via ejector 58. Outlet 34 is disposed on downstream portion 30 of body 24. Upstream portion 28 is disposed downstream along first centerline axis $A_{C1}$ relative to inlet 32. Downstream portion 30 is disposed upstream along first centerline axis $A_{C1}$ relative to outlet 34. Gravitational bottom 42 is disposed at a bottom-most portion of body 24 relative to the orientation shown in FIGS. 3A and 3B. Being that direction G of gravity is shown as straight down in FIGS. 3A and 3B, gravitational bottom 42 of body 24 is located on the point of body 24 that is furthest downward portion of body 24.

Outer chamber 44 is disposed in a radially outer portion of body 24. Outer chamber 44 is fluidly connected to pockets 16A and 16B, to bosses 18A and 18B via pockets 16A and 16B, to inlet 32 via serpentine channel 52, and to outlet 34. Outer chamber 44 is encased, or contained, by outer wall 26. Outer chamber 44 extends between outer wall 26 and inner nozzle 50. Upstream end 46 of outer chamber 44 is disposed in downstream portion 30 and is fluidly connected to serpentine channel 52. Downstream end 48 of outer chamber 44 is disposed in upstream portion 28 of body 24 and is fluidly connected to outlet 34. Inner nozzle 50 is disposed radially within outer wall 26 and is physically connected to outer wall 30 via trusses or other physical attachments. Inner nozzle 50 is fluidly connected to inlet 32 by way of an upstream end of inner nozzle 50 being disposed in or adjacent to a portion of inlet 32. Inner nozzle 50 is fluidly connected to outlet 34 by way of a downstream end of inner nozzle 50 being disposed in or adjacent to a portion of outlet 34. Inner nozzle 50 is co-axial with first centerline axis $A_{C1}$.

Serpentine channel 52 is fluidly connected to outer chamber 44 and to inlet 32. Serpentine channel 52 is disposed radially between outer wall 26 of body 24 and inner nozzle 50. Serpentine channel 52 is disposed radially outwards from and circumferentially surrounds inner nozzle 50. Serpentine channel 52 is formed by portions of inner nozzle 50, flow guides 56A and 56B, and outer wall 26. Serpentine channel 52 is configured to guide a direction of flow passing through serpentine channel 52 from a downstream direction of water extractor 14, to an upstream direction of water extractor 14, and back to the downstream direction of water extractor 14. Annular gap 54 is fluidly connected to inlet 32 and circumferentially extends around an upstream end of inner nozzle 50. Annular gap 54 is disposed radially between inner nozzle 50 and a portion of serpentine channel 52. Flow guides 56A and 56B are disposed radially outward from inner nozzle 50. Flow guides 56A and 56B form contours and edges of serpentine channel 52. Ejector 58 is fluidly connected to outer chamber 44 and is disposed radially outward from inner nozzle 50. Ejector 58 is disposed radially outward from inner nozzle 50 and radially inward from a portion of outer wall 26 that is near outlet 34.

Vanes 60 are connected to or formed together with inlet 32. Vanes 60 are disposed along an internal (e.g., radially inward) surface of a portion of inlet 32. Vanes 60 extend radially inward from an internal surface of inlet 32 and in a direction that is off-axis from a main flow direction of inlet 32 such that vanes 60 are configured to impart swirl upon a fluid, such as cooling flow of air, that passes across vanes 60. In this non-limiting embodiment, second angle $\theta_2$ is greater than zero, and can include an angle of 10 degrees to 90 degrees, such as an angle of 25 degrees as shown in FIGS. 3A and 3B. Second centerline axis $A_{C2}$ is oriented approximately perpendicular to direction G of gravity and approximately parallel to horizontal plane H.

During operation of ACP 10, a cooling flow of air is sent from condenser 12 (shown in FIG. 1) to water extractor 14. The cooling flow of air enters water extractor 14 via inlet 32. Before the cooling flow of air enters into body 24 of water extractor 14, vanes 60 swirl initial flow $F_A$ in order to cause moisture in initial flow $F_A$ to move in a radially outward direction. In another non-limiting embodiment, a bend in a duct position upstream from inlet 32 can be configured to swirl initial flow $F_A$ before initial flow $F_A$ enters into water extractor 14. Since the cooling flow of air is swirling as the cooling flow of air enters body 24, moisture in the cooling flow of air is forced centrifugally in a radially outwards direction. Here, the cooling flow of air is split into primary flow $F_1$ and secondary flow $F_2$ within water extractor 14. Thus, as the cooling flow of air enters into body 24 through inlet 32, secondary flow $F_2$ is diverted through serpentine channel 52 and into outer chamber 44, while first flow $F_1$ is drawn into and through inner nozzle 50. Due to the swirling of the cooling flow of air by vanes 60, second flow $F_2$ entering serpentine channel 52 contains a high amount of moisture due to serpentine channel 52 being positioned radially outwards of inner nozzle 50.

As secondary flow $F_2$ travels through and around serpentine channel 52, a rate of flow of secondary flow $F_2$ reduces in response to an increased effective flow area of outer chamber 44. With the slower flow rate of secondary flow $F_2$ through outer chamber 44, moisture from secondary flow $F_2$ is deposited in the form of moisture droplets onto an inner surface of outer wall 26. The moisture droplets deposited onto outer wall 26 are then drawn in a downwards direction due to gravity and are received by pocket 16A. In one non-limiting embodiment, moisture (or water) is received from secondary flow $F_2$ into pocket 16 by withdrawing water from secondary flow $F_2$ from upstream end 46 of outer chamber 44. In another non-limiting embodiment, water is received from secondary flow $F_2$ into pocket 16 by withdrawing water from secondary flow $F_2$ at gravitational bottom 42 of body 24.

In another non-limiting embodiment, secondary flow $F_2$ (e.g., air/water mixture) enters annular gap 54 at the same velocity as primary flow $F_1$ enters inner nozzle 50. A volume, or cross-sectional area, of serpentine channel 52 increases rapidly as serpentine channel 52 extends from annular gap 54 to outer chamber 44. This increase in cross-sectional area and/or volume of serpentine channel 52 results in a sudden reduction in velocity of secondary flow $F_2$ in serpentine channel 52. As such, the suspended water droplets fall out of secondary flow $F_2$ due to the reduction in velocity and attach to outer wall 26. The water then runs down outer wall 26 to collect in pocket 16A and to exit through boss 18A.

The moisture collected by pocket 16A is then communicated into and through boss 18A as flow $F_W$. In one non-limiting embodiment, flow $F_W$ communicated through boss 18A can include both liquid water and moisture-laden air. Flow $F_W$ that is drawn through and out of boss 18A and can be fed into a component or element that is fluidly attached to boss 18A such as a water recirculation, filtration, or cooling device (not shown) or sprayed directly on the face of a heat exchanger to increase its cooling efficiency. After moisture is removed from secondary flow $F_2$, secondary flow $F_2$ continues through outer chamber 44, passes through ejector 58, and is combined with primary flow $F_1$ flowing through inner nozzle 50. As secondary flow $F_2$ passes through ejector 58, most or all of the moisture has been removed from secondary flow $F_2$. Primary flow $F_1$ flowing through inner nozzle 50 contains a higher velocity than secondary flow $F_2$ coming out of outer chamber 44 which creates a pressure differential to draw or pull secondary flow $F_2$ out of outer chamber 44 and through ejector 58. After secondary flow $F_2$ passes through ejector 58, secondary flow $F_2$ enters outlet 34 along with primary flow $F_1$. Primary flow $F_1$ and secondary flow $F_2$ are rejoined after removing water from secondary flow $F_2$ to form resultant flow $F_R$ of air. Resultant flow $F_R$ of air is then sent to ACM 20 (shown in FIG. 1) that is fluidly connected to water extractor 14.

By locating pocket 16A at gravitational bottom 42 of body 24, pocket 16A (and therefore boss 18A) is located at a low point of body 24. With pocket 16A being located at the low point of body 24, all of the moisture collected in body 24 gathers into pocket 16A as the moisture drains out of body 24.

Pocket 16A (and boss 18A) are also located in an ideal flow velocity area of outer chamber 44. The ideal flow velocity area of outer chamber 44 is located in the portion of outer chamber 44 where secondary flow $F_2$ makes its final turn from and out of serpentine channel 52 and into outer chamber 44. At this location, secondary flow $F_2$ is travelling in generally the same downstream direction as a direction of primary flow $F_1$ through inner nozzle 50. This portion of secondary flow $F_2$ does not need to undergo a drastic change in direction to enter into boss 18A via pocket 16A because boss 18A extends generally in a similar direction as the direction of secondary flow $F_2$ through outer chamber 44. Having pocket 16A being located at the ideal flow velocity area of outer chamber 44 allows the maximum amount of moisture to be removed from secondary flow $F_2$ to enter into boss 18A via pocket 16A which maximizes the efficiency of water extractor 14.

Water extractor 14 with pocket 16A and boss 18A allows water extractor 14 to be installed in a non-horizontal orientation with no loss of efficiency by providing pocket 16A (and boss 18A) that is located in the ideal flow velocity area of outer chamber 44 of body 24. Water extractor 14 with pocket 16A and boss 18A provide for increases in efficiency of water extraction from existing amounts near 85% up to new efficiency rates of 95% or greater. Water extractor 14 provides a relatively low cost design change that will allow off-the-shelf ACPs to be installed in non-horizontal angles as needed by individual engine requirements.

Discussion of Possible Embodiments

The following are non-exclusive descriptions of possible embodiments of the present invention.

A water extractor includes a body, an inlet, a vane, an outlet, a first centerline axis, an inner nozzle, an outer chamber, a serpentine channel, a pocket, and a boss. The body includes an outer wall. The inlet is disposed on an upstream end of the body and the outlet is disposed on a downstream end of the body. The vane is disposed along an internal surface of the inlet and is configured to impart swirl upon a fluid that passes across the vane. The first centerline axis extends through a center of each of the body, the outlet, and the inlet. The inner nozzle is disposed radially inward from the outer wall and is co-axial with the first centerline axis. The outer chamber is disposed in the body and extends between the outer wall and the inner nozzle. The outer chamber is fluidly connected to the inlet and the outlet. The serpentine channel is disposed radially between the outer wall of the body and the inner nozzle and fluidly connects the inlet and the outer chamber. The pocket is attached to a portion of the outer wall of the body and is fluidly connected to a portion of the outer chamber. The pocket is configured to collect water from a flow of fluid passing through the outer chamber. The boss extends from and is fluidly connected to a portion of the pocket. The boss includes a second centerline axis such that an angle between the second centerline axis and the first centerline axis is approximately 10 degrees or greater.

The water extractor of the preceding paragraph can optionally include, additionally and/or alternatively, any one or more of the following features, configurations and/or additional components.

The pocket can be disposed on a gravitational bottom portion of the body.

The water extractor can be configured as an inertial particle separator.

The second centerline axis of the boss can be approximately parallel to a horizontal plane.

The serpentine channel can be disposed radially outwards from and/or circumferentially surround the inner nozzle, and/or further wherein the serpentine channel can be configured to guide a direction of flow passing through the serpentine channel from a downstream direction, to an upstream direction, and/or back to the downstream direction.

The outer wall of the body can comprise a downstream portion and an upstream portion located upstream from the downstream portion relative to a direction of flow through the inner nozzle, wherein the pocket can comprise an upstream end and a downstream end, wherein the upstream end of the pocket can be attached to the upstream portion of the outer wall, and/or wherein the boss can be connected to the downstream end of the pocket.

An angle between the first centerline axis and a direction of gravity can be approximately 105 degrees or greater.

A method of extracting water from a flow of air includes swirling a flow of air with a vane. The flow of air is inserted into a water extractor. The water extractor includes a first centerline axis passing through a center of the water extractor along a longitudinal direction of the water extractor. The flow of air is split into a primary flow and a secondary flow within the water extractor. The secondary flow is diverted into an outer chamber of the water extractor disposed between an inner nozzle and an outer wall of a body of the water extractor. Water separated from the secondary flow is received into a pocket fluidly connected to the outer chamber and attached to the outer wall of the body of the water extractor. The water received by the pocket is communicated into a boss connected to the pocket. The water is drawn from the boss. The boss includes a second centerline axis that is set at a first angle relative to the first centerline axis that is approximately 10 degrees or greater.

The method of the preceding paragraph can optionally include, additionally and/or alternatively, any one or more of the following steps, features, configurations and/or additional components.

The flow of air from a condenser of an air conditioning pack can be sent to the water extractor, the primary flow and secondary flow can be rejoined after removing water from the secondary flow to form a resultant flow of air, and/or the resultant flow of air can be sent to an air cycle machine that can be fluidly connected to the water extractor.

Water can be withdrawn from the secondary flow from an upstream end of the outer chamber.

Water can be withdrawn from the secondary flow at a gravitational bottom of the body.

A second angle between the first centerline axis and a horizontal plane can be greater than zero degrees.

An air conditioning pack for an aircraft includes a condenser, an air cycle machine connected to the condenser, and a water extractor. The water extractor includes a body with an outer wall, an inner nozzle, an inlet, a vane, an outlet, an outer chamber, a pocket, and a boss. The outer wall includes an upstream portion and a downstream portion. The inner nozzle is disposed radially inward from the outer wall. The upstream and downstream portions of the outer wall are oriented relative to a direction of a flow of fluid through the inner nozzle. The inlet is disposed on an upstream end of the body and is fluidly connected to the condenser. The vane disposed in the inlet and is configured to impart swirl on air that passes across the vane. The outlet is disposed on a downstream end of the body and is fluidly connected to the air cycle machine. The outer chamber is disposed in the body and extends between the outer wall and the inner nozzle. The outer chamber is fluidly connected to the inlet and the outlet. The outer chamber includes an upstream portion and a downstream portion. The outer chamber is configured to receive a flow moisture-laden air from the inlet and is configured to deposit moisture from the flow moisture-laden air onto the outer wall. The pocket is connected to the outer wall of the body and includes an upstream portion and a downstream portion. The upstream portion of the pocket is attached to the upstream portion of the outer wall and is fluidly connected to the upstream portion of the outer chamber. The pocket is configured to collect the deposited moisture from the outer wall. The boss extends from the pocket and is fluidly connected to the outer chamber via the pocket. The boss is configured to withdraw the collected moisture from the pocket.

The air conditioning pack of the preceding paragraph can optionally include, additionally and/or alternatively, any one or more of the following features, configurations and/or additional components.

A portion of the pocket can be connected to a location of the outer wall of the body that can be at a gravitational bottom of the outer wall of the body.

A first centerline axis can pass through a center of the inner nozzle, wherein the boss can further comprise a second centerline axis passing through a center of the boss, wherein the second centerline axis can be at an angle relative to the first centerline axis that can be greater than zero degrees, and/or wherein the second centerline axis can be oriented parallel to a horizontal plane.

The angle between the first and second centerline axes can include an angle of approximately 10 to 90 degrees.

An angle between the first centerline axis and a horizontal plane can be approximately 10 degrees or greater.

The water extractor can be configured as an inertial particle separator.

A serpentine channel disposed radially between the inner nozzle and the outer chamber, and/or an annular gap can be disposed between the serpentine channel and the inner nozzle, wherein the annular gap can fluidly connect the serpentine channel and the inlet.

The serpentine channel can be disposed radially outwards from and/or circumferentially surround the inner nozzle, and further wherein the serpentine channel can be configured to guide a direction of flow passing through the serpentine channel from a downstream direction, to an upstream direction, and/or back to the downstream direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A water extractor comprising:
   a body with an outer wall;
   an inlet disposed on an upstream end of the body;
   an outlet disposed on a downstream end of the body;
   a first centerline axis extending through a center of each of the body, the outlet, and the inlet, wherein an angle between the first centerline axis and a horizontal plane is approximately 10 degrees or greater, wherein the horizontal plane is representative of a horizontal direction when the aircraft is on the ground or is in horizontal flight;
   an inner nozzle disposed radially inward from the outer wall, wherein the inner nozzle is co-axial with the first centerline axis;
   an outer chamber disposed in the body and extending between the outer wall and the inner nozzle, wherein the outer chamber is fluidly connected to the inlet and the outlet;
   a serpentine channel disposed radially between the outer wall of the body and the inner nozzle;
   an annular gap disposed radially outward from the inner nozzle, wherein the annular gap fluidly connects the inlet and the serpentine channel;
   a pocket attached to a portion of the outer wall of the body and fluidly connected to a portion of the outer chamber, wherein the pocket is configured to collect water from a flow of fluid passing through the outer chamber; and
   a boss extending from and fluidly connected to a portion of the pocket, wherein the boss includes a second centerline axis, wherein an angle between the second centerline axis and the first centerline axis is approximately 10 degrees or greater.

2. The water extractor of claim 1, wherein the pocket is disposed on a gravitational bottom portion of the body.

3. The water extractor of claim 1, wherein the water extractor is configured as an inertial particle separator.

4. The water extractor of claim 1, wherein the second centerline axis of the boss is approximately parallel to a horizontal plane.

5. The water extractor of claim 1, wherein the serpentine channel is disposed radially outwards from and circumferentially surrounds the inner nozzle, and further wherein the serpentine channel is configured to guide a direction of flow passing through the serpentine channel from a downstream direction, to an upstream direction, and back to the downstream direction.

6. The water extractor of claim 1, wherein the outer wall of the body comprises a downstream portion and an upstream portion located upstream from the downstream portion relative to a direction of flow through the inner nozzle, wherein the pocket comprises an upstream end and a downstream end, wherein the upstream end of the pocket is attached to the upstream portion of the outer wall, and wherein the boss is connected to the downstream end of the pocket.

7. A method of extracting water from a flow of air, the method comprising:
   swirling the flow of air;
   inserting the flow of air into a water extractor, wherein the water extractor includes a first centerline axis passing through a center of the water extractor along a longitudinal direction of the water extractor, wherein an angle between the first centerline axis and a horizontal plane is approximately 10 degrees or greater, wherein the horizontal plane is perpendicular to a direction of gravity;
   splitting the flow of air into a primary flow and a secondary flow within the water extractor;
   diverting the secondary flow into an outer chamber of the water extractor, wherein the outer chamber is disposed between an inner nozzle and an outer wall of a body of the water extractor;
   receiving water separated from the secondary flow into a pocket fluidly connected to the outer chamber and attached to the outer wall of the body of the water extractor;
   communicating the water received by the pocket into a boss connected to the pocket; and
   drawing the water from the boss, wherein the boss includes a second centerline axis that is set at a first angle relative to the first centerline axis, wherein the first angle is approximately 10 degrees or greater.

8. The method of claim 7, further comprising:
   sending the flow of air from a condenser of an air conditioning pack to the water extractor;
   rejoining the primary flow and secondary flow in an outlet of the water extractor after removing water from the secondary flow to form a resultant flow of air; and
   sending the resultant flow of air to an air cycle machine that is fluidly connected to the water extractor.

9. The method of claim 7, wherein receiving water from the secondary flow into the pocket further comprises withdrawing water from the secondary flow from an upstream end of the outer chamber.

10. The method of claim 7, wherein receiving water from the secondary flow into the pocket further comprises withdrawing water from the secondary flow at a gravitational bottom of the body.

11. The method of claim 7, wherein a second angle between the first centerline axis and a horizontal plane is greater than zero degrees.

12. An air conditioning pack for an aircraft, the air conditioning pack comprising:
   a condenser;
   an air cycle machine fluidly connected to the condenser; and
   a water extractor fluidly connecting the condenser to the air cycle machine, the water extractor comprising:
      a body with an outer wall, wherein the outer wall comprises an upstream portion and a downstream portion;
      an inner nozzle disposed radially inward from the outer wall, wherein the upstream and downstream portions of the outer wall are oriented relative to a direction of a flow of fluid through the inner nozzle;
      an inlet disposed on an upstream end of the body and fluidly connected to the condenser;
      an outlet disposed on a downstream end of the body and fluidly connected to the air cycle machine;
      a first centerline axis extending through a center of each of the body, the outlet, and the inlet, wherein an angle between the first centerline axis and a horizontal plane is approximately 10 degrees or greater, wherein the horizontal plane is representative of a horizontal direction when the aircraft is on the ground or is in horizontal flight;
      an outer chamber disposed in the body and extending between the outer wall and the inner nozzle, wherein the outer chamber is fluidly connected to the inlet and the outlet, wherein the outer chamber comprises an upstream portion and a downstream portion, wherein the outer chamber is configured to receive a flow moisture-laden air from the inlet, and wherein the outer chamber is configured to deposit moisture from the flow moisture-laden air onto the outer wall;
      a pocket connected to the outer wall of the body, wherein the pocket comprises an upstream portion and a downstream portion, wherein the upstream portion of the pocket is attached to the upstream portion of the outer wall and is fluidly connected to the upstream portion of the outer chamber, and wherein the pocket is configured to collect the deposited moisture from the outer wall; and
      a boss extending from the pocket, wherein the boss is fluidly connected to the upstream portion of the outer chamber via the pocket, wherein the boss is configured to withdraw the collected moisture from the pocket.

13. The air conditioning pack of claim 12, wherein a portion of the pocket is connected to a location of the outer wall of the body that is at a gravitational bottom of the outer wall of the body.

14. The air conditioning pack of claim 13, wherein the water extractor is configured as an inertial particle separator.

15. The air conditioning pack of claim 13, further comprising:
   a serpentine channel disposed radially between the inner nozzle and the outer chamber; and
   an annular gap disposed between the serpentine channel and the inner nozzle, wherein the annular gap fluidly connects the serpentine channel and the inlet.

16. The air conditioning pack of claim 15, wherein the serpentine channel is disposed radially outwards from and circumferentially surrounds the inner nozzle, and further wherein the serpentine channel is configured to guide a direction of flow passing through the serpentine channel from a downstream direction, to an upstream direction, and back to the downstream direction.

17. The air conditioning pack of claim 12, wherein the boss further comprises a second centerline axis passing through a center of the boss, wherein the second centerline axis is at an angle relative to the first centerline axis that is greater than zero degrees, and wherein the second centerline axis is oriented parallel to the horizontal plane and perpendicular to the direction of gravity.

18. The air conditioning pack of claim 17, wherein the angle between the first and second centerline axes is approximately 10 to 45 degrees.

19. The air conditioning pack of claim 18, wherein an angle between the first centerline axis and the horizontal plane is approximately 10 degrees or greater.

* * * * *